United States Patent Office 3,332,964
Patented July 25, 1967

3,332,964
TETRAALKYL ESTERS OF DIPHENYL METHANE 3,4,3',4'-TETRACARBOXYLIC ACID, DIPHENYL METHANE 3,4,3',4' - TETRACARBOXYLIC ACID AND THE ANHYDRIDE OF SAID ACIDS
John H. McCracken, Monroeville, and Johann G. D. Schulz and Arthur C. Whitaker, Pittsburgh, Pa., assignors to Gulf Research & Development Company, Pittsburgh, Pa., a corporation of Delaware
No Drawing. Filed June 18, 1963, Ser. No. 288,622
12 Claims. (Cl. 260—346.3)

This application is a continuation-in-part of our U.S. application for Letters Patent, Ser. No. 72,578, filed Nov. 30, 1960, now abandoned.

This invention relates to a process for preparing the tetraalkyl esters of diphenyl methane 3,4,3',4'-tetracarboxylic acid, diphenyl methane 3,4,3',4'-tetracarboxylic acid and the anhydride of said acids, namely, diphenyl methane 3,4,3',4'-tetracarboxylic dianhydride. This invention also relates to the tetraalkyl esters of diphenyl methane 3,4,3',4'-tetracarboxylic acid, diphenyl methane 3,4, 3',4'-tetracarboxylic acid and diphenyl methane 3,4,3',4'-tetracarboxylic dianhydride as new compounds. The esters, acid and anhydride described and defined herein can be employed as intermediates in the preparation of plasticizers, plastics and fibers. Additionally the anhydride can be employed as a curing agent for epoxy resins. As an example of further uses, for instance, the new esters can be reacted with polyhydric alcohols in the presence of a basic catalyst upon the application of heat to form polymers suitable as coatings as follows:

$$ROOC-\underset{ROOC}{\bigcirc}-CH_2-\underset{COR}{\bigcirc}-COR + HO(CH_2)_xOH \longrightarrow$$

$$ROOC-\underset{ROOC}{\bigcirc}-CH_2-\underset{COR}{\bigcirc}-\overset{O}{C}-\left[O-(CH_2)_x-O-\overset{O}{C}-\underset{C=O}{\bigcirc}-CH_2-\underset{OR}{\bigcirc}-\overset{O}{C}-OR\right]_n$$

wherein $x$ is a small integer, R is an alkyl group and $n$ is an integer greater than two.

As charge for the process we can use tetraalkyl esters of benzophenone 3,4,3',4'-tetracarboxylic acid wherein the alkyl portion of the carboalkoxy group is selected from the group consisting of an alkyl radical having from one to 19 carbon atoms, preferably from one to nine carbon atoms. The phenyl radicals in such charge can carry as nuclear substituents thereon 0 to three radicals selected from the group consisting of primary, secondary and tertiary alkyls having from one to 16 carbon atoms, preferably from one to eight carbon atoms, such as, methyl, ethyl, n-propyl, isopropyl, isobutyl, amyl, isoamyl, hexyl, isooctyl, decyl, tetradecyl, hexadecyl, etc., F, Cl, Br, I, $NH_2$, OH, etc. Specific examples of charges that can be employed include 3,4,3',4'-tetracarbomethoxy benzophenone, 6-amino, 3,4,3',4'-tetracarboethoxy benzophenone, 6-chloro, 3,4,3',4'-tetracarbopropoxy benzophenone, 5,5'-dimethyl, 3,4,3',4'-tetracarbobutoxy benzophenone, 6-hydroxy, 3,4,3',4'-tetracarbopentoxy benzophenone, 3,4,3',4'-tetracarbohexatoxy benzophenone, 3,4, 3',4' - tetracarboheptoxy benzophenone, 3,4,3',4' - tetracarboisooctoxy benzophenone, 3,4,3',4'-tetracarbononoxy benzophenone, 3,4,3',4'-tetracarbodecoxy benzophenone, 3,4,3',4' - tetracarboundecoxy benzophenone, 3,4,3',4'-tetracarbododecoxy benzophenone, 3,4,3',4'-tetracarbotridecoxy benzophenone, 3,4,3',4'-tetracarbotetradecoxy benzophenone, 3,4,3',4' - tetracarbopentadecoxy benzophenone, 3,4,3',4'-tetracarbohexadecoxy benzophenone, 3,4,3',4'-tetracarboheptadecoxy benzophenone, 3,4,3',4'-tetracarbooctadecoxy benzophenone, 3,4,3',4'-tetracarbononadecoxy benzophenone, etc.

The ketone charge defined above is converted in accordance with the process of this invention by hydrogenation to the desired ester of a diphenyl methane tetracarboxylic acid. The ketone charge being solid can not normally be subjected to the desired hydrogenation conditions. Prior to hydrogenation, therefore, the ester is admixed with a suitable carrier. The carrier, however, must be selected with extreme care and caution. In order to obtain maximum yields of the tetraalkyl esters of diphenyl methane 3,4,3',4'-tetracarboxylic acid under the reaction conditions defined herein, particularly at a selected temperature level, the carrier for the hydrogenation reaction must be a liquid hydrocarbon. A liquid alkanol carrier, such as methanol, ethanol, propanol, etc. during the hydrogenation reaction defined herein must be avoided, for at any selected temperature level the ketone charge defined above would have a tendency to be converted preferably to the corresponding ester of a diphenyl carbinol carboxylic acid rather than to the desired corresponding tetraalkyl ester of diphenyl methane 3,4,3',4'-tetracarboxylic acid. By proper selection of carrier for the hydrogenation reaction, therefore, the defined process can be directed to the desired compound. Sufficient carrier should be employed to maintain the mixture of ketone charge and carrier in a fluid state. Thus at least about 50, preferably about 400 to about 600, percent by weight of carrier relative to the ketone charge is sufficient.

The hydrogenation reaction leading to the desired tetraalkyl esters of diphenyl methane 3,4,3',4'-tetracarboxylic acid is carried out by subjecting the mixture defined above to suitable hydrogenation conditions. Thus a temperature of at least about 110° C., preferably about 135° to about 200° C., and a pressure of at least about 300 pounds per square inch gauge, preferably a pressure of about 500 to about 1500 pounds per square inch gauge is sufficient. A contact time of at least about 15 minutes, preferably about 0.5 to about three hours, is also sufficient. Hydrogenation catalysts which can be employed include nickel, cobalt, copper chromite, etc. At least about two percent by weight, preferably about five to about 10 percent by weight, of catalyst based on the ketone charge is satisfactory. Stoichiometric amounts of hydrogen are consumed.

At the end of the hydrogenation reaction the contents of the reactor is maintained at a temperature of about 25° to about 100° C. and the hydrogenation catalyst separated therefrom by any suitable means preferably by filtration. The remainder of the reaction system is then treated in any suitable manner to recover the desired tetraalkyl ester of diphenyl methane 3,4,3′,4′-tetracarboxylic acid found therein. This can be effected, for example, by cooling the reaction system to room temperature. Crystallization of the desired product will occur. By evaporation or other suitable means the carrier employed is reduced in volume from 25 to 50 percent. The remainder of the desired tetraalkyl esters of diphenyl methane 3,4,3′,4′-tetracarboxylic acid will crystallize out of solution and can be separated therefrom by filtration.

To obtain the desired ketone charge defined above benzophenone 3,4,3′,4′-tetracarboxylic acid obtained in accordance with the procedure set forth in U.S. Patent No. 3,075,007, dated Jan. 22, 1963 can be employed. Briefly in the process of the patent a 3,4,3′,4′-tetraalkyl diarylalkane, such as 1,1-dixylylethane, is oxidized with nitric acid having a concentration of about five to about 50 percent at a temperature of about 110° to about 150° C. and a pressure of about atmospheric to about 500 pounds per square inch gauge for about one minute to about 48 hours. At the end of this time an amorphous diaryl ketone tetracarboxylic acid, such as benzophenone 3,4,3′,4′-tetracarboxylic acid, precipitates out of the reaction system and can be recovered therefrom by simple filtration.

To prepare the desired ketone charge using the above-identified diaryl ketone carboxylic acids, the first step involves converting the symmetrical diaryl ketone carboxylic acid to the corresponding alkyl ester. This is effected by reacting the symmetrical diaryl ketone carboxylic acid with a suitable alkanol. Desirably the amount of alkanol employed is in excess of the amount stoichiometrically required to react with the diaryl ketone carboxylic acid. Generally at least about 200, and preferably 300 to about 600 percent by weight, of alkanol in excess of that stoichiometrically needed to react with the diaryl ketone carboxylic acid is sufficient. About 0.1 to about 10 percent by weight, based on the diaryl ketone carboxylic acid, of an esterification catalyst such as sulfuric acid, hydrochloric acid, toluene sulfonic acid and phosphoric acid can also be employed. The esterification reaction is carried out at a temperature of at least about 4° C., preferably about 100° to about 150° C., and autogenous pressure for at least about ten minutes, preferably about 0.5 to about five hours.

As an example, when the symmetrical diaryl ketone carboxylic acid defined above was admixed with methanol a slurry formed, since the acid was not completely soluble in the methanol. At the end of the esterification period the product was recovered by crystallization and filtration. With excess alkanol present the esterification reaction will proceed to the right and formation of a stable ester is assured. To the ketone charge thus obtained catalyst and hydrogen can then be added and the reaction mixture obtained can then be subjected to the hydrogenation conditions previously described.

A particularly attractive feature of the present invention resides in the fact that the procedure defined herein provides an extremely attractive route for the production of diphenyl methane 3,4,3′,4′-tetracarboxylic acid and diphenyl methane 3,4,3′,4′-tetracarboxylic dianhydride. It would appear that an effective method for preparing diphenyl methane 3,4,3′,4′-tetracarboxylic acid and diphenyl methane 3,4,3′,4′-tetracarboxylic dianhydride would involve the mere hydrogenation of the diaryl ketone carboxylic acids defined hereinabove. The diphenyl methane 3,4,3′,4′-tetracarboxylic acid so produced would then merely be heated and dehydration would result in the production of diphenyl methane 3,4,3′,4′-tetracarboxylic anhydride. When attempts have been made to hydrogenate diaryl ketone carboxylic acids in a number of carriers, such as water, methane, tertiary butanol, dioxane, etc., little or none of the desired reaction took place and in most instances salts of the hydrogenation catalysts were produced instead.

Another effective method for preparing diphenyl methane 3,4,3′,4′-tetracarboxylic acid would appear to involve the mere condensation of ortho phthalic acid with formaldehyde in the presence of sulfuric acid, on the basis that condensation of meta phthalic acid with formaldehyde has resulted in the production of diphenyl methane 3,5,3′,5′-tetracarboxylic acid. When attempts have been made to condense ortho phthalic acid with formaldehyde in the presence of sulfuric acid, however, diphenyl methane 3,4,3′,4′-tetracarboxylic acid was not obtained.

The tetraalkyl esters of diphenyl methane 3,4,3′,4′-tetracarboxylic acid resulting from the hydrogenation procedure defined herein can be converted to the corresponding acid by saponification. Thus the tetraalkyl ester of diphenyl methane 3,4,3′,4′-tetracarboxylic acid can be reacted with at least the stoichiometric amount of an alkaline material, such as sodium hydroxide, potassium hydroxide, calcium hydroxide and ammonium hydroxide, preferably in an aqueous solution, at a temperature of about 25° to about 200° C. and a pressure of about 0 to about 200 pounds per square inch gauge for a period of time which can be from about 10 minutes to about 10 hours. At the end of such period the solution is cooled and acidified with at least a stoichiometric amount of a strong mineral acid, such as hydrochloric acid, sulfuric acid, phosphoric acid, nitric acid, etc., at a temperature of about 25° to about 100° C. and atmospheric pressure.

The desired diphenyl methane 3,4,3′,4′-tetracarboxylic acid can be recovered from solution in any suitable manner. If the desired acid is solid it can be recovered from the mixture by filtration. If the desired acid is still in solution the mixture can be heated to evaporate water therefrom to a point wherein the desired acid will come out of solution and can be recovered by filtration. The recovered acid can be dried at a temperature of about 50 to about 90° C. and a pressure of about two inches to about 30 inches of mercury. To obtain diphenyl methane 3,4,3′,4′-tetracarboxylic dianhydride from the acid so produced the acid is merely heated at a temperature of about 100° to about 200° C. and a pressure of about two inches to about 30 inches of mercury for a period which can be about one minute to 24 hours in order to drive water therefrom. Alternatively, the dianhydride can be obtained from the acid as defined by heating in the presence of an acid anhydride such as acetic anhydride.

The process of this invention can further be described by reference to the following examples:

*Example I*

59.6 grams of 1,1-dixylylethane were oxidized with 750 grams of nitric acid having a concentration of 30 percent at a temperature of about 170° C. and a pressure of 300 pounds per square inch gauge for 2.5 hours. The benzophenone 3,4,3′,4′-tetracarboxylic acid recovered amounted to 63 grams. Into a 500-milliliter round-bottomed flask equipped with a stirrer and steam jacket there was charged 63 grams of the benzophenone 3,4,3′,4′-tetracarboxylic acid so produced, 0.3 liter of methanol and one gram of aqueous sulfuric acid having a concentration of 95 percent. The contents was heated with stirring to reflux for one hour. At the end of this time the flask was cooled to room temperature and the slurry withdrawn and filtered. The solid recovered was a crystalline tetramethyl ester of benzophenone 3,4,3′,4′-tetracarboxylic acid. A slurry of 29 grams of the tetramethyl ester of benzophenone 3,4,3′,4′-tetracarboxylic acid in 150 milliliters of heptane was hydrogenated in a 300 milliliter autoclave over five grams of nickel catalyst (Harshaw 0104) at 150° C. and 1000 pounds per square inch gauge for five hours. The reactor was cooled and the product washed with methanol. The methanol-heptane solution was filtered through Celite and the filtrate evaporated to 24.5 grams of a light yellow-green oil. Infrared analysis and chromatography of a portion of this product on alumina indicated that it was the tetramethyl ester of diphenyl methane 3,4,3',4'-tetracarboxylic acid.

Example II

That at a selected temperature level the carrier for the hydrogenation reaction defined herein must be a hydrocarbon rather than a liquid alkanol is apparent from the following. A solution of 100 grams of the tetramethyl ester of benzophenone 3,4,3',4'-tetracarboxylic acid in 500 milliliters of methanol was hydrogenated over 15 grams of nickel catalyst (Harshaw 0104) at 150° C. and 1000 pounds per square inch gauge for one hour. The methanol solution resulting was worked up resulting in an analysis indicating a product of which 83 percent was the tetramethyl ester of benzhydrol 3,4,3',4'-tetracarboxylic acid and the remainder was shown to be the tetramethyl ester of diphenyl methane 3,4,3',4'-tetracarboxylic acid by physical recovery.

Example III

A solution of 100 grams of the tetraisooctyl ester of benzophenone 3,4,3',4'-tetracarboxylic acid in 500 milliliters of heptane was hydrogenated over 15 grams of nickel catalyst (Harshaw 0104) at 155° C. and 1000 pounds per square inch gauge for two hours. The resulting solution, after normal work up, was evaporated to give 98 grams of a colorless, viscous oil, of which 68 percent was found to be the tetraisooctyl ester of benzhydrol 3,4,3',4'-tetracarboxylic acid. The remainder of the product was the tetraisooctyl ester of diphenyl methane 3,4,3',4'-tetracarboxylic acid.

Example IV

This example further shows that at a selected temperature level the carrier for the hydrogenation reaction defined heerin must be a liquid hydrocarbon. A solution of 31 grams of the tetraisooctyl ester of benzophenone 3,4,3',4'-tetracarboxylic acid in 150 milliliters of methanol was hydrogenated over three grams of nickel catalyst (Harshaw 0104) at 155° C. and 1000 pounds per square inch gauge for 2½ hours. The organic solution resulting from normal work up was evaporated to give 24 grams of a colorless, viscous oil which was found to be the tetraisooctyl ester of benzhydrol 3,4,3',4'-tetracarboxylic acid.

Example V

A solution of 95 grams of the tetraisooctyl ester of benzophenone 3,4,3',4'-tetracarboxylic acid in 500 milliliters of heptane was hydrogenated over 15 grams of nickel catalyst (Harshaw 0104) at 185° C. and 1000 pounds per square inch gauge for two hours. The resulting solution gave, after work up and evaporation, 86.8 grams of a yellow-green oil which was dissolved in acetone and filtered through activated alumina to remove suspended catalyst therefrom. The acetone was evaporated to give 85.1 grams of a colorless, viscous oil which was found to be the tetraisooctyl ester of diphenyl methane 3,4,3',4'-tetracarboxylic acid.

From the above it can be seen that in order to obtain high yields of the tetraalkyl ester of diphenyl methane 3,4,3',4'-tetracarboxylic acid at a designated temperature level it is imperative that hydrogenation be effected in the presence of a hydrocarbon carrier. Even when the hydrogenation reaction was conducted at a temperature level with a liquid alkanol carrier in an attempt to facilitate conversion of the tetraalkyl ester of benzophenone 3,4,3',4'-tetracarboxylic acid to the tetraalkyl ester of diphenyl methane 3,4,3',4'- tetracarboxylic acid greater yields of the desired tetraalkyl esters of diphenyl methane 3,4,3',4'-tetracarboxylic acid were obtained at the same temperature level when a liquid hydrocarbon was employed as carrier. Thus when the hydrogenation reactions of Examples I and II were carried out at a temperature of 150° C., the former using heptane as carrier and the latter methanol, in Example I all of the product was the tetraalkyl ester of diphenyl methane 3,4,3',4'-tetracarboxylic acid, while in Example II most of the product was the tetramethyl ester of benzhydrol 3,4,3',4'-tetracarboxylic acid. Comparable results were obtained in Examples III and IV.

The examples below illustrate a procedure for obtaining from the desired esters produced above as a new compound diphenyl methane 3,4,3',4'-tetracarboxylic acid.

Example VI 70 grams of the tetramethyl ester of diphenyl methane 3,4,3',4'-tetracarboxylic acid and 150 milliliters of a 30 percent aqueous sodium hydroxide solution were maintained at reflux for two days at a temperature of 100° C. and at atmospheric pressure. The colorless solution was then acidified with 130 grams of a 38 percent aqueous hydrochloric acid solution resulting in the precipitation of diphenyl methane 3,4,3',4'-tetracarboxylic acid.

Example VII

The compound obtained in Example VI was heated to reflux over a period of one hour in the presence of 100 grams of acetic anhydride and the product obtained was identified to be diphenyl methane 3,4,3',4'-tetracarboxylic dianhydride.

That diaryl ketone carboxylic acids can not easily be hydrogenated in common carriers to corresponding diphenyl methane carboxylic acids is apparent from an inspection of the following runs.

Example VIII

A slurry of 25 grams of benzophenone 3,4,3',4'-tetracarboxylic acid in 150 milliliters of distilled water was hydrogenated over five grams of nickel catalyst (Harshaw 0104) at 175° C. and 1000 pounds per square inch gauge over 1¾ hours. The green solution remaining after removal of the free catalyst therefrom by passing through Celite was evaporated to dark green viscous oil. This was dissolved in aqueous sodium hydroxide which sprung a large amount of nickel hydroxide. This was filtered off and the filtrate acidified with hydrochloric acid to give the disodium salt of benzophenone 3,4,3',4'-tetracarboxylic acid.

Example IX

A slurry of 25 grams benzophenone 3,4,3',4'-tetracarboxylic acid in 150 milliliters of methanol was hydrogenated in a 300 milliliter autoclave over five grams of nickel catalyst (Harshaw 0104) at 135° C. and 1000 pounds per square inch gauge for two hours. The solution, after filtering through Celite, was diluted with 250 milliliters of a 10 percent aqueous sodium bicarbonate solution and then extracted three times with 75 milliliters of ether. The ether solution was evaporated to give 0.3 grams (one percent by weight) of ester products.

In a second run under similar conditions, 100 grams of benzophenone 3,4,3',4'-tetracarboxylic acid in 500 milliliters of methanol was hydrogenated over 25 grams of the same catalyst for two hours at the same temperature and pressure. The product after evaporation of the methanol was a dark green gum. Addition of acetone precipitated 10 grams of a white solid identified as unreacted benzophenone 3,4,3',4'-tetracarboxylic acid which is insoluble in this solvent. An acetone-soluble portion after evaporation had a neutral equivalent of 104, which compares with 86, the theoretical value of diphenyl methane 3,4,3',4'-tetracarboxylic acid.

Example X

A slurry of 125 grams of benzophenone 3,4,3',4'-tetracarboxylic acid in 500 milliliters of methanol was hydrogenated over 25 grams of nickel catalyst (Harshaw 0104) at 150° C. and 1000 pounds per square inch gauge for three hours. The solution, after catalyst removal, was evaporated to a yellow-green solid. The neutral equivalent of the product after removal of unreacted benzophenone 3,4,3',4'-tetracarboxylic acid was 105 which compares to 86, the theoretical value of diphenyl methane 3,4,3',4'-tetracarboxylic acid.

*Example XI*

A slurry of 150 grams of benzophenone 3,4,3',4'-tetracarboxylic acid in 500 milliliters of methanol was hydrogenated over 15 grams of barium-promoted copper chromite catalyst at 140° C. and 1000 pounds per square inch gauge for 1¾ hours. The methanol solution, after catalyst removal, was orange in color, indicating incorporation of chromium. After several attempts to remove the chromium by ion exchange the reaction was discarded.

*Example XII*

A slurry of 100 grams of benzophenone 3,4,3',4'-tetracarboxylic acid in 500 milliliters of tertiary butanol was hydrogenated over 15 grams of nickel catalyst (Harshaw 0104) at 130° C. and 1000 pounds per square inch gauge for 1¾ hours. The butanol solution, after catalyst removal, was evaporated to give a solid identified as benzophenone 3,4,3',4'-tetracarboxylic acid.

*Example XIII*

A slurry of 100 grams of benzophenone 3,4,3',4'-tetracarboxylic acid in 500 milliliters of tertiary butanol was hydrogenated over 15 grams of nickel catalyst (Harshaw 0104) at 160° C. and 1000 pounds per square inch gauge for two hours. The reaction mixture removed from the autoclave was a purple pasty mass which smelled of butene. This was filtered and the solids were dissolved in concentrated hydrochloric acid, which caused an immediate formation of black nickel. Apparently the catalyst had been incorporated completely as nickel salt, so no further work was attempted.

*Example XIV*

A slurry of 100 grams of benzophenone 3,4,3',4'-tetracarboxylic acid in 500 milliliters of tertiary butanol was hydrogenated over 25 grams of cobalt catalyst (Girdler 897RS) at 170° C. and 1000 pounds per square inch gauge for 1½ hours. The reaction mixture removed from the autoclave was a red pasty mass which smelled of butene. Apparently the catalyst had been incorporated completely as a cobalt salt, so the reaction was discarded.

*Example XV*

A solution of 100 grams of benzophenone 3,4,3',4'-tetracarboxylic acid in 500 milliliters of para-dioxane was hydrogenated over 25 grams of nickel catalyst (Harshaw 104) at 130° C. and 1000 pounds per square inch gauge for one hour. The dioxane solution after catalyst removal was evaporated to a light green solid and identified to be benzophenone 3,4,3',4'-tetracarboxylic acid.

*Example XVI*

A solution of 100 grams of benzophenone 3,4,3',4'-tetracarboxylic acid in 500 milliliters of para-dioxane was hydrogenated over 15 grams of nickel catalyst (Harshaw 104) at 180° C. and 1000 pounds per square inch gauge for 2½ hours. The dioxane solution was evaporated to a light green solid having a neutralization equivalent of 107. This compares with a neutralization equivalent of 86 for diphenyl methane 3,4,3',4'-tetracarboxylic acid.

*Example XVII*

A solution of 50 grams of benzophenone 3,4,3',4'-tetracarboxylic dianhydride in 500 milliliters of para-dioxane was hydrogenated over seven grams of nickel catalyst (Harshaw 0104) at 180° C. and 1000 pounds per square inch gauge for one hour. The light green dioxane solution, after catalyst removal, was evaporated to a light green solvent having a neutral equivalent of 110.

*Example XVIII*

That diphenyl methane 3,4,3',4'-tetracarboxylic acid can not be obtained by condensing ortho phthalic acid with formaldehyde is apparent from the following. Thirty-three grams of ortho phthalic acid was dissolved in 100 milliliters of 20 percent oleum (a sulfuric acid containing free sulfur trioxide). To this solution 3.1 grams of paraformaldehyde was added and the mixture was maintained at a temperature of 110° to 119° C. for six hours. The mixture was cooled, poured into ice water, filtered, and dried in a vacuum oven at 50° C. The initial melting point of the solid product so obtained was 180° C., which was believed to be ortho phthalic acid as indicated by infrared analysis. The material was permitted to cool and then to crystallize. On reheating the product so obtained had a sharp melting point of 132° C. which is the melting point of ortho phthalic anhydride. The melting point of diphenyl methane 3,4,3',4'-tetracarboxylic acid is 290° C.

Obviously many modifications and variations of the invention as hereinabove set forth can be made without departing from the spirit and scope thereof and therefore only such limitations should be imposed as are indicated in the appended claims.

We claim:
1. A process for preparing a tetraalkyl ester of diphenyl methane 3,4,3',4'-tetracarboxylic acid which comprises hydrogenating a tetraalkyl ester of benzophenone 3,4,3',4'-tetracarboxylic acid wherein the alkyl portion thereof has from one to 19 carbon atoms in a liquid hydrocarbon in the presence of hydrogen and a hydrogenation catalyst selected from the group consisting of nickel, cobalt and copper chromite at a temperature of about 110° to about 200° C.

2. A process for preparing a tetraalkyl ester of diphenyl methane 3,4,3',4'-tetracarboxylic acid which comprises hydrogenating a tetraalkyl ester of benzophenone 3,4,3',4'-tetracarboxylic acid wherein the alkyl portion thereof has from one to 19 carbon atoms in heptane in the presence of hydrogen and a hydrogenation catalyst selected from the group consisting of nickel, cobalt and copper chromite at a temperature of about 110° to about 200° C.

3. A process for preparing a tetramethyl ester of diphenyl methane 3,4,3',4'-tetracarboxylic acid which comprises hydrogenating a tetramethyl ester of benzophenone 3,4,3',4'-tetracarboxylic acid in heptane in the presence of hydrogen and a hydrogenation catalyst selected from the group consisting of nickel, cobalt and copper chromite at a temperature of about 110° to about 200° C.

4. A process for preparing a tetraisooctyl ester of diphenyl methane 3,4,3',4'-tetracarboxylic acid which comprises hydrogenating a tetraisooctyl ester of benzophenone 3,4,3',4'-tetracarboxylic acid in heptane in the presence of hydrogen and a hydrogenation catalyst selected from the group consisting of nickel, cobalt and copper chromite at a temperature of about 110° to about 200° C.

5. A process for preparing a tetraalkyl ester of diphenyl methane 3,4,3',4'-tetracarboxylic acid which comprises hydrogenating a tetraalkyl ester of benzophenone 3,4,3',4'-tetracarboxylic acid wherein the alkyl portion thereof has from one to 19 carbon atoms in a liquid hydrocarbon in the presence of hydrogen and a hydrogenation catalyst selected from the group consisting of nickel, cobalt and copper chromite at a temperature of about 110° to about 200° C. and thereafter converting the ester so produced by saponification to diphenyl methane 3,4,3',4'-tetracarboxylic acid.

6. A process for preparing a tetraalkyl ester of diphenyl methane 3,4,3',4'-tetracarboxylic acid which comprises hydrogenating a tetraalkyl ester of benzophenone 3,4,3',4'-tetracarboxylic acid wherein the alkyl portion thereof has from one to 19 carbon atoms in heptane in the presence of hydrogen and a hydrogenation catalyst selected from the group consisting of nickel, cobalt and copper chromite at a temperature of about 110° to about 200° C. and thereafter converting the ester so produced by saponification to diphenyl methane 3,4,3',4'-tetracarboxylic acid.

7. A process for preparing a tetramethyl ester of diphenyl methane 3,4,3',4'-tetracarboxylic acid which comprises hydrogenating a tetramethyl ester of benzophenone 3,4,3',4'-tetracarboxylic acid in heptane in the presence of hydrogen and a hydrogenation catalyst selected from the group consisting of nickel, cobalt and copper chromite at a temperature of about 110° to about 200° C. and thereafter converting the ester so produced by saponification to diphenyl methane 3,4,3',4'-tetracarboxylic acid.

8. A process for preparing a tetraisooctyl ester of diphenyl methane 3,4,3',4'-tetracarboxylic acid which comprises hydrogenating a tetraisooctyl ester of benzophenone 3,4,3',4'-tetracarboxylic acid in heptane in the presence of hydrogen and a hydrogenation catalyst selected from the group consisting of nickel, cobalt and copper chromite at a temperature of about 110° to about 200° C. and thereafter converting the ester so produced by saponification to diphenyl methane 3,4,3',4'-tetracarboxylic acid.

9. A process for preparing a tetraalkyl ester of diphenyl methane 3,4,3',4'-tetracarboxylic acid which comprises hydrogenating a tetraalkyl ester of benzophenone 3,4,3',4'-tetracarboxylic acid wherein the alkyl portion thereof has from one to 19 carbon atoms in a liquid hydrocarbon in the presence of hydrogen and a hydrogenation catalyst selected from the group consisting of nickel cobalt and copper chromite at a temperature of about 110° to about 200° C., thereafter converting the ester so produced by saponification to diphenyl methane 3,4,3',4'-tetracarboxylic acid and further converting the acid so obtained by heating to diphenyl methane 3,4,3',4'-tetracarboxylic dianhydride.

10. A process for preparing a tetraalkyl ester of diphenyl methane 3,4,3',4'-tetracarboxylic acid which comprises hydrogenating a tetraalkyl ester of benzophenone 3,4,3',4'-tetracarboxylic acid wherein the alkyl portion thereof has from one to 19 carbon atoms in heptane in the presence of hydrogen and a hydrogenation catalyst selected from the group consisting of nickel, cobalt and copper chromite at a temperature of about 110° to about 200° C., thereafter converting the ester so produced by saponification to diphenyl methane 3,4,3',4'-tetracarboxylic acid and further converting the acid so obtained by heating to diphenyl methane 3,4,3',4'-tetracarboxylic dianhydride.

11. A process for preparing a tetramethyl ester of diphenyl methane 3,4,3',4'-tetracarboxylic acid which comprises hydrogenating a tetramethyl ester of benzophenone 3,4,3',4'-tetracarboxylic acid in heptane in the presence of hydrogen and a hydrogenation catalyst selected from the group consisting of nickel, cobalt and copper chromite at a temperature of about 110° to about 200° C., thereafter converting the ester so produced by saponification to diphenyl methane 3,4,3',4'-tetracarboxylic acid and further converting the acid so obtained by heating to diphenyl methane 3,4,3',4'-tetracarboxylic dianhydride.

12. A process for preparing a tetraisooctyl ester of diphenyl methane 3,4,3',4'-tetracarboxylic acid which comprises hydrogenating a tetraisooctyl ester of benzophenone 3,4,3',4'-tetracarboxylic acid in heptane in the presence of hydrogen and a hydrogenation catalyst selected from the group consisting of nickel, cobalt and copper chromite at a temperature of about 110° to about 200° C., thereafter converting the ester so produced by saponification to diphenyl methane 3,4,3',4'-tetracarboxylic acid and further converting the acid so obtained by heating to diphenyl methane 3,4,3',4'-tetracarboxylic dianhydride.

References Cited

UNITED STATES PATENTS

| | | | |
|---|---|---|---|
| 2,712,543 | 7/1955 | Gresham et al. | 260—346.3 |
| 3,108,085 | 10/1963 | Broadhead | 260—346.3 |
| 3,257,452 | 6/1966 | Le Blanc et al. | 260—515 |

OTHER REFERENCES

LeBlanc et al., Journal of Organic Chemistry, vol. 26 (1961) pages 4731-3.

ALEX MAZEL, *Primary Examiner.*

JAMES H. TURNIPSEED, *Assistant Examiner.*